(12) United States Patent
Heshig et al.

(10) Patent No.: US 12,392,599 B1
(45) Date of Patent: Aug. 19, 2025

(54) HYBRID DISPLACEMENT MEASURING DEVICE

(71) Applicant: CHANGCHUN INSTITUTE OF OPTICS, FINE MECHANICS AND PHYSICS, CHINESE ACADEMY OF SCIENCES, Changchun (CN)

(72) Inventors: Bayan Heshig, Changchun (CN); Xinyu Wang, Changchun (CN); Zhaowu Liu, Changchun (CN); Shan Jiang, Changchun (CN); Wenhao Li, Changchun (CN); Wei Wang, Changchun (CN); Xingyu Zhu, Changchun (CN)

(73) Assignee: CHANGCHUN INSTITUTE OF OPTICS, FINE MECHANICS AND PHYSICS, CHINESE ACADEMY OF SCIENCES, Changchun (CN)

( * ) Notice: Subject to any disclaimer, the term of this patent is extended or adjusted under 35 U.S.C. 154(b) by 0 days.

(21) Appl. No.: 19/050,445

(22) Filed: Feb. 11, 2025

(30) Foreign Application Priority Data

Mar. 27, 2024 (CN) .......................... 202410358004.0

(51) Int. Cl.
*G01B 9/02* (2022.01)
*G01B 9/02015* (2022.01)
*G01B 11/02* (2006.01)

(52) U.S. Cl.
CPC ..... *G01B 9/02029* (2013.01); *G01B 9/02027* (2013.01); *G01B 9/02045* (2013.01); *G01B 11/026* (2013.01); *G01B 2290/70* (2013.01)

(58) Field of Classification Search
CPC ............ G01B 9/02029; G01B 9/02027; G01B 9/02045; G01B 11/026; G01B 2290/70
See application file for complete search history.

(56) References Cited

U.S. PATENT DOCUMENTS

| 5,050,993 A | * | 9/1991 | Tansey ..................... G01D 5/38 |
| | | | 250/237 G |
| 5,122,660 A | * | 6/1992 | Yoshii ....................... G02B 7/32 |
| 2005/0062981 A1 | * | 3/2005 | Kao .................... G01B 9/02027 |
| | | | 356/499 |
| 2007/0058172 A1 | * | 3/2007 | Van Der Pasch ... G03F 7/70775 |
| | | | 356/521 |

(Continued)

FOREIGN PATENT DOCUMENTS

| CN | 102944176 A | 2/2013 |
| CN | 108692663 A | 10/2018 |

*Primary Examiner* — Jonathan M Hansen
(74) *Attorney, Agent, or Firm* — George D. Morgan

(57) ABSTRACT

The present invention relates to the field of optics, in particular to a hybrid displacement measuring device, comprising a worktable to be measured, a grating ruler, a laser light source, a first beam splitting mirror, a first measuring assembly, and a second measuring assembly which comprises a first interferometer. A hybrid measuring approach that integrates grating and laser is proposed based on the advantages of the two measuring means. The grating ruler is used to perform long-distance measurement distal to the mirror, and the first interferometer is used to perform short-distance measurement proximal to the mirror, thereby solving the problem that it is difficult to guarantee both the range and the precision of displacement measurement of the worktable to be measured.

9 Claims, 10 Drawing Sheets

(56) References Cited

U.S. PATENT DOCUMENTS

| | | | |
|---|---|---|---|
| 2007/0195334 A1* | 8/2007 | Tamiya | G01D 5/38 356/616 |
| 2013/0278914 A1* | 10/2013 | Demarest | G03F 9/7092 355/72 |
| 2015/0268031 A1 | 9/2015 | Zhu et al. | |
| 2019/0011248 A1* | 1/2019 | Tamiya | G01B 9/02018 |
| 2019/0310072 A1* | 10/2019 | Wu | G01D 5/266 |

* cited by examiner

HYBRID DISPLACEMENT MEASURING DEVICE

CROSS-REFERENCE TO RELATED APPLICATIONS

The application claims priority to Chinese patent application No. 2024103580040, filed on Mar. 27, 2024, the entire contents of which are incorporated herein by reference.

TECHNICAL FIELD

The present invention relates to the field of optics, in particular to a hybrid displacement measuring device.

BACKGROUND

A scanning beam interference lithography system involves allowing small-sized Gaussian beams to coincide at a surface of a grating substrate and interfere with each other to form an interference field, performing lithography by means of two-dimensional motion of a worktable and by way of scanning, achieving movement of interference fringes along with the grating substrate by means of dynamic phase-locking, so as to fabricate a large-sized holographic grating by way of matching. However, the non-ideal motion of the worktable, if not corrected, may introduce an additional error when fabricating the grating.

Optical measurement techniques are presently widely used all over the world, the most common ones being laser interferometers and grating interferometry systems. Due to the influence of direct current drift, single-frequency laser interferometers are not widely used in the field of worktable displacement measurement. Dual-frequency laser interferometers have a strong anti-interference ability and enable accurate measurement thanks to the alternating current characteristics of the system, and are used in most long-travel and high-precision worktable displacement measurements. A grating displacement measurement system uses a grating as a measuring scale and uses the grating spacing of the grating as a measuring basis. The grating grooves have low sensitivity to the environment, and the distance between the grating and a reading head is small and will not increase with the increase in measuring distance. The grating displacement measurement system represents a worktable measurement technique commonly used in industrial production.

The measuring basis of a laser interferometer is the wavelength of laser. In a non-vacuum environment, the wavelength varies with fluctuations in environmental factors such as temperature, humidity, and pressure gradient, which affects the measuring precision of the laser interferometer, thus leading to a decrease in the quality of scanning lithography of a scanning beam interference lithography system. With the environmental control indexes being the same, a grating interferometer achieves higher measurement stability than a laser interferometer thanks to an extremely short optical path, reducing dependence on the working environment. However, since the grating interferometer uses a reading head that is mechanically connected to an object to be measured as position feedback, it is not suitable for displacement measurement of a step-and-scan two-dimensional worktable.

SUMMARY

In order to address the above problems, provided in the present invention is a hybrid displacement measuring device, which solves the problems associated with the limitation in the use of an existing grating interferometer and an existing laser interferometer during the process of measurement.

In order to achieve the above objective, provided in the present invention is a hybrid displacement measuring device, comprising a worktable to be measured, a grating ruler, a laser light source, a first beam splitting mirror, a first measuring assembly, and a second measuring assembly; the laser light source is used to generate a laser beam; the first beam splitting mirror is positioned at an output end of the laser light source, and is used to split the laser beam to generate a first basic reflected beam and a first basic transmitted beam; the first measuring assembly is positioned on the optical path of the first basic reflected beam, the first measuring assembly comprises a turning mirror combination and a reading head combination, the reading head combination comprises at least one reading head, the turning mirror combination is used to turn the first basic reflected beam to the grating ruler, such that the grating ruler diffracts the first basic reflected beam and generates a diffracted beam, the turning mirror combination is also used to turn the diffracted beam to the reading head, the reading head is used to generate, according to the diffracted beam, first displacement information of the worktable to be measured; the second measuring assembly comprises a first reflective mirror and a first interferometer, the first interferometer and the first reflective mirror are positioned on the optical path of the first basic transmitted beam sequentially, the first reflective mirror is positioned on the worktable to be measured, and is used to reflect the first basic transmitted beam to the first interferometer, the first interferometer is used to generate, according to the first basic transmitted beam reflected by the first reflective mirror, second displacement information of the worktable to be measured; the first beam splitting mirror, the turning mirror combination, and the first reflective mirror are all maintained fixed relative to the worktable to be measured.

In some embodiments, the turning mirror combination comprises a second reflective mirror, a second beam splitting mirror, a first turning mirror, a third reflective mirror, a second turning mirror, and a fourth reflective mirror, the second reflective mirror is positioned on the optical path of the first basic reflected beam; the second beam splitting mirror is positioned facing a reflection surface of the second reflective mirror, the second beam splitting mirror is used to split the first basic reflected beam turned by the second reflective mirror to generate a first reflected beam and a first transmitted beam, the first reflected beam is turned by the second beam splitting mirror to the grating ruler, such that the grating ruler diffracts the first reflected beam and generates a first primary diffracted beam; the first turning mirror is positioned on the optical path of the first primary diffracted beam, and is used to turn the first primary diffracted beam to the second beam splitting mirror, through which the first primary diffracted beam is transmitted the reading head; the third reflective mirror is positioned on the optical path of the first transmitted beam, and is used to turn the first transmitted beam to the grating ruler, such that the grating ruler diffracts the first transmitted beam and generates a second primary diffracted beam; the second turning mirror is positioned on the optical path of the second primary diffracted beam, and is used to turn the second primary diffracted beam; the fourth reflective mirror is positioned on the turning path of the second primary diffracted beam, and is used to turn the second primary diffracted beam to the second beam splitting mirror, where the second primary diffracted beam is reflected to the reading head; the first primary diffracted beam and the second primary diffracted beam generate an interference signal, and the reading head generates the first displacement information according to the interference signal.

In some embodiments, the first primary diffracted beam includes a first positive primary diffracted beam and a first negative primary diffracted beam, and the second primary diffracted beam includes a second positive primary diffracted beam and a second negative primary diffracted beam; the number of the first turning mirror is two, and each of the first turning mirrors is positioned corresponding to one of the first primary diffracted beams; the number of the second turning mirror is two, and each of the second turning mirrors is positioned corresponding to one of the second primary diffracted beams; the number of the fourth reflective mirror is two, and each of the fourth reflective mirrors is positioned corresponding to one of the second primary diffracted beams; the number of the reading head is two, and each of the reading heads is positioned corresponding to one of the first primary diffracted beams; the interference signal includes a first interference signal and a second interference signal, the first positive primary diffracted beam and the second negative primary diffracted beam generate the first interference signal, and the first negative primary diffracted beam and the second positive primary diffracted beam generate the second interference signal, the reading head combination generates the first displacement information according to the first interference signal and the second interference signal.

In some embodiments, the first turning mirror and/or the second turning mirror are any one of a trapezoidal turning prism, a planar reflective mirror, a one-dimensional transmission grating, and a condenser lens.

In some embodiments, the second beam splitting mirror is a polarizing beam splitting prism, and the turning mirror combination further comprises a first quarter-wave plate and a second quarter-wave plate, the first quarter-wave plate is positioned between the first turning mirror and the second beam splitting mirror, and is used to adjust the polarization states of the first primary diffracted beam; the second quarter-wave plate is positioned between the second turning mirror and the fourth reflective mirror, and is used to adjust the polarization states of the second primary diffracted beam.

In some embodiments, the worktable to be measured comprises a first worktable and a second worktable positioned from bottom to top, the first worktable can move along a first direction relative to the grating ruler, and the second worktable can move along a second direction relative to the grating ruler, the first direction being perpendicular to the second direction; the turning mirror combination is maintained fixed relative to the first worktable, and the first displacement information is the displacement information of the first worktable; the first reflective mirror is maintained fixed relative to the second worktable, and the second displacement information is the displacement information of the second worktable.

In some embodiments, the grating ruler comprises a first grating ruler and a second grating ruler arranged in parallel along the second direction, the first grating ruler and the second grating ruler both extending along the first direction X; the number of the first measuring assembly is two, with one of the first measuring assemblies being positioned corresponding to the first grating ruler, and the other of the second measuring assemblies being positioned corresponding to the second grating ruler.

In some embodiments, further included are a second interferometer, a third interferometer, a fourth interferometer, and a fifth interferometer; the second interferometer is positioned on the turning path of the first reflective mirror, and is used to measure third displacement information of the worktable to be measured in the first direction; the third interferometer is positioned below the first grating ruler, and is used to measure fourth displacement information of the worktable to be measured in a third direction, the third direction Z being perpendicular to the first direction and the second direction, respectively; the fourth interferometer is positioned below the second grating ruler, and is arranged in parallel with the third interferometer along the second direction, the fourth interferometer is used to measure fifth displacement information of the worktable to be measured in the third direction; the fifth interferometer is positioned below the second grating ruler, and is positioned between the fourth interferometer and the first measuring assembly below the second grating ruler, the fifth interferometer is used to measure sixth displacement information of the worktable to be measured in the third direction.

In some embodiments, a displacement measuring unit, a photoelectric conversion module, and a control unit are further comprised, the displacement measuring unit is electrically connected to the reading head, and is used to generate an interference signal according to the first primary diffracted beam and the second primary diffracted beam; the photoelectric conversion module is electrically connected to the displacement measuring unit, and is used to convert the interference signal into an electrical signal; the control unit is used to generate the first displacement information according to the electrical signal.

In some embodiments, a display unit is further comprised, the display unit is electrically connected to the control unit, and is used to display the first displacement information.

Compared with the prior art, the present invention can achieve the following beneficial effects:

The hybrid displacement measuring device comprises the worktable to be measured, the grating ruler, the laser light source, the first beam splitting mirror, the first measuring assembly, and the second measuring assembly. The first beam splitting mirror, the turning mirror combination, and the first reflective mirror are all maintained fixed relative to the worktable to be measured. The laser light source is used to generate a laser beam. The first beam splitting mirror splits the laser beam and generates a first basic reflected beam and a first basic transmitted beam. The first basic reflected beam enters the grating ruler under the action of the turning mirror combination and is diffracted by the grating ruler to generate a diffracted beam. The diffracted beam is then acquired by the reading head to generate the first displacement information of the worktable to be measured. The first basic transmitted beam is reflected by the first reflective mirror and then enters the first interferometer, which acquires the second displacement information of the worktable to be measured. The displacement measurement of the worktable to be measured by the entire hybrid displacement measuring device is achieved by means of the first displacement information and the second displacement information. In this technical solution, a hybrid measuring approach that integrates grating and laser is proposed based on the advantages of the two measuring means. The grating ruler is used to perform long-distance measurement distal to the mirror, and the first interferometer is used to perform short-distance measurement proximal to the mirror, thereby solving the problem that it is difficult to guarantee both the range and the precision of displacement measurement of a step-and-scan two-dimensional worktable to be measured.

Figure 1:
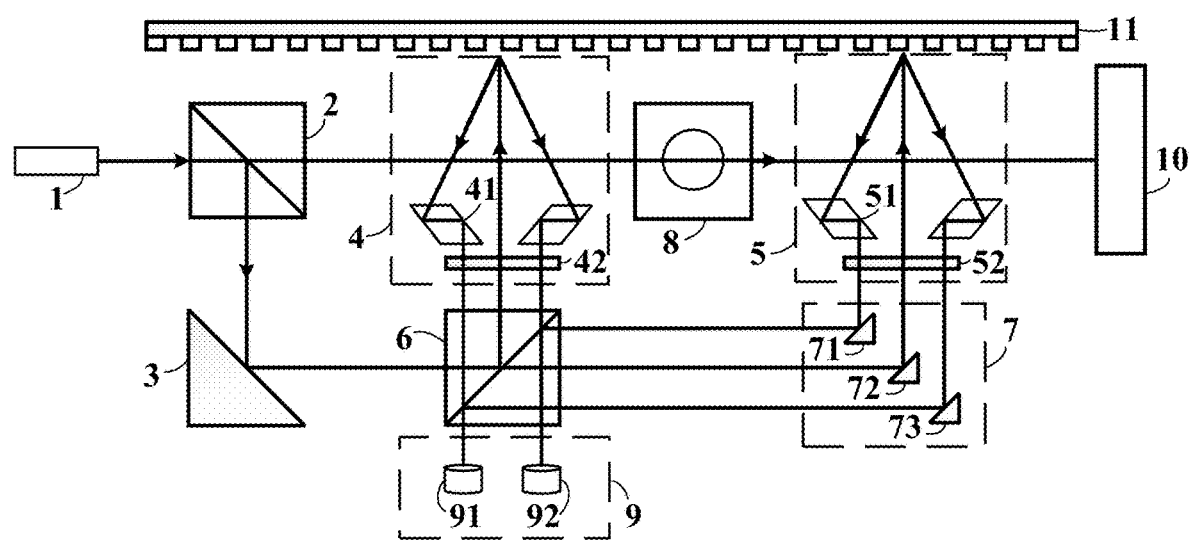
FIG. 1 is a first schematic diagram of a hybrid displacement measuring device provided in an embodiment of the present invention.

Reference signs in the drawings include: 1. laser light source; 2. first beam splitting mirror; 3. second reflective mirror; 4. first measuring unit; 41. first turning mirror; 42. first quarter-wave plate; 5. second measuring unit; 51. second turning mirror; 52. second quarter-wave plate; 6. second beam splitting mirror; 7. reflective mirror combination; 71. fifth reflective mirror; 72. third reflective mirror; 73. sixth reflective mirror; 8. first interferometer; 9. reading head combination; 91. first reading head; 92. second reading head; 10. first reflective mirror; 11. grating ruler; 12. third interferometer; 13. fourth interferometer; 14. fifth interferometer; 15. first measuring assembly; 16. third measuring assembly; 17. second interferometer; 18. first grating ruler; 19. second grating ruler; 100. hybrid displacement measuring device; 101. turning mirror combination; 102. first worktable; 103. second worktable; 104. displacement measuring unit; 105. optoelectronic conversion module; 106. control unit; 107. display unit; X. first direction; Y second direction; Z. third direction.

DETAILED DESCRIPTION OF THE EMBODIMENTS

Embodiments of the present invention will be described hereinafter with reference to accompanying drawings. In the following description, like modules are represented by the same reference sign. With the same reference sign, their name and function are also the same. Accordingly, detailed description thereof will not be repeated.

In order to make the purpose, technical solutions, and advantages of the present invention clearer, the present invention will be further explained in detail below in conjunction with the accompanying drawings and specific embodiments. It should be understood that the specific embodiments described herein are only intended to explain the present invention and do not constitute limitation to the present invention.

With reference to FIGS. 1 to 7, this embodiment provides a hybrid displacement measuring device, comprising a worktable to be measured, a grating ruler 11, a laser light source 1, a first beam splitting mirror 2, a first measuring assembly, and a second measuring assembly. The laser light source 1 is used to generate a laser beam. The first beam splitting mirror 2 is positioned at an output end of the laser light source 1, and is used to split the laser beam to generate a first basic reflected beam and a first basic transmitted beam. The first measuring assembly is positioned on the optical path of the first basic reflected beam. The first measuring assembly comprises a turning mirror combination and a reading head combination 9. The reading head combination 9 comprises at least one reading head. The turning mirror combination is used to turn the first basic reflected beam to the grating ruler 11, such that the grating ruler 11 diffracts the first basic reflected beam and generates a diffracted beam. The turning mirror combination is also used to turn the diffracted beam to the reading head. The reading head is used to generate, according to the diffracted beam, first displacement information of the worktable to be measured. The second measuring assembly comprises a first reflective mirror 10 and a first interferometer 8. The first interferometer 8 and the first reflective mirror 10 are positioned on the optical path of the first basic transmitted beam sequentially. The first reflective mirror 10 is positioned on the worktable to be measured, and is used to reflect the first basic transmitted beam to the first interferometer 8. The first interferometer 8 is used to generate, according to the first basic transmitted beam reflected by the first reflective mirror 10, second displacement information of the worktable to be measured. The first beam splitting mirror 2 and the turning mirror combination are fixed relative to a lower worktable, and the first reflective mirror 10 is fixed relative to an upper worktable.

In this embodiment, the worktable to be measured can be understood as a scan-and-step two-dimensional worktable that requires displacement measurement. The laser source 1 is used to generate a laser beam, and the first beam splitting mirror 2, the position at which it is positioned being as shown in FIG. 1, is used to split the laser beam emitted by the laser source 1. It should be noted that the laser beam can be a laser beam containing orthogonal polarization states, and the first beam splitting mirror 2 may not be a polarizing beam splitting mirror. Therefore, the beam splitting effect of the first beam splitting mirror 2 will be unrelated to the polarization states of the laser beam; that is, the first basic reflected beam contains light waves with two polarization states, and the first basic transmitted beam contains light waves with two polarization states.

The first measuring assembly is positioned on the optical path of the first basic reflected beam. The first measuring assembly comprises the turning mirror combination and the reading head combination 9. The turning mirror combination can be understood as a combination of a plurality of optical lenses positioned according to predetermined positions. The turning mirror combination can cause the first basic reflected beam to enter the grating ruler 11 by means of refraction, reflection, transmission, etc. The grating ruler 11 diffracts the first basic reflected beam to form a diffracted beam, which enters the reading head combination 9 by means of refraction, reflection, transmission, etc. by the turning mirror combination and is acquired by the reading head. Hence, the displacement information carried in the first basic reflected beam, that is, the first displacement information of the worktable to be measured, is acquired.

It should be noted here that the turning mirror combination is fixed relative to the worktable to be measured. Therefore, when the worktable to be measured moves, the optical path of the first basic reflected beam turned by the turning mirror combination will move along with the worktable to be measured. That is, the turned optical path of the first basic reflected beam will move relative to the grating ruler 11, such that the diffracted beam generated from the turned first basic reflected beam by the grating ruler 11 carries position information. This principle can be used to achieve position tracking of the worktable to be measured.

The second measuring assembly is used to perform position measurement on the first basic transmitted beam. Specifically, the second measuring assembly comprises the first reflective mirror 10 and the first interferometer 8. The first interferometer 8 can be a laser interferometer. The position at which the first interferometer 8 is positioned is shown in FIG. 1, and the first reflective mirror 10 is positioned on the worktable to be measured. Hence, when the first reflective mirror 10 moves along with the worktable to be measured, a change in the reflection path of the first basic transmitted beam will occur and will then be captured by the first interferometer 8. The first interferometer 8 generates the second displacement information of the worktable to be measured according to the reflected beam of the first basic transmitted beam after being reflected by the first reflective mirror 10.

This embodiment achieves displacement measurement on the worktable to be measured by the entire hybrid displacement measuring device by means of the first displacement information and the second displacement information. A hybrid measuring approach that integrates grating and laser is proposed based on the advantages of the two measuring means. The grating ruler 11 is used to perform long-distance measurement distal to the mirror, and the first interferometer 8 is used to perform short-distance measurement proximal to the mirror, thereby solving the problem that it is difficult to guarantee both the range and the precision of displacement measurement of a step-and-scan two-dimensional worktable to be measured.

With reference to FIGS. 1 to 7, in some embodiments, the turning mirror combination comprises a second reflective mirror 3, a second beam splitting mirror 6, a first turning mirror 41, a third reflective mirror 72, a second turning mirror 51, and a fourth reflective mirror. The second reflective mirror 3 is positioned on the optical path of the first basic reflected beam. The second beam splitting mirror 6 is positioned facing a reflection surface of the second reflective mirror 3. The second beam splitting mirror 6 is used to split the first basic reflected beam turned by the second reflective mirror 3 to generate a first reflected beam and a first transmitted beam. The first reflected beam is turned by the second beam splitting mirror 6 to the grating ruler 11, such that the grating ruler 11 diffracts the first reflected beam and generates a first primary diffracted beam.

The first turning mirror 41 is positioned on the optical path of the first primary diffracted beam, and is used to turn the first primary diffracted beam to the second beam splitting mirror 6, where the first primary diffracted beam is transmitted to the reading head. The third reflective mirror 72 is positioned on the optical path of the first transmitted beam, and is used to turn the first transmitted beam to the grating ruler 11, such that the grating ruler 11 diffracts the first transmitted beam and generates a second primary diffracted beam. The second turning mirror 51 is positioned on the optical path of the second primary diffracted beam, and is used to turn the second primary diffracted beam. The fourth reflective mirror is positioned on the turning path of the second primary diffracted beam, and is used to turn the second primary diffracted beam to the second beam splitting mirror 6, where the second primary diffracted beam is reflected to the reading head. The first primary diffracted beam and the second primary diffracted beam generate an interference signal, and the reading head generates the first displacement information according to the interference signal.

It should be noted that for ease of understanding, upper-level expressions of first measuring unit 4, second measuring unit 5, and reflective mirror combination 7 are added in this embodiment. The first measuring unit 4 comprises at least one first turning mirror 41, as well as a first quarter-wave plate 42 described hereinafter, and the second measuring unit 5 comprises at least one second turning mirror 51, as well as a second quarter-wave plate 52 described hereinafter. The reflective mirror combination 7 comprises the third reflective mirror 72, as well as at least one fourth reflective mirror. It can be understood that when the number of fourth reflective mirror is two, the two fourth reflective mirrors are designated as fifth reflective mirror 71 and sixth reflective mirror 73, respectively. When the number of the reading head is two, the reading heads are designated as first reading head 91 and second reading head 92.

Figure 2:
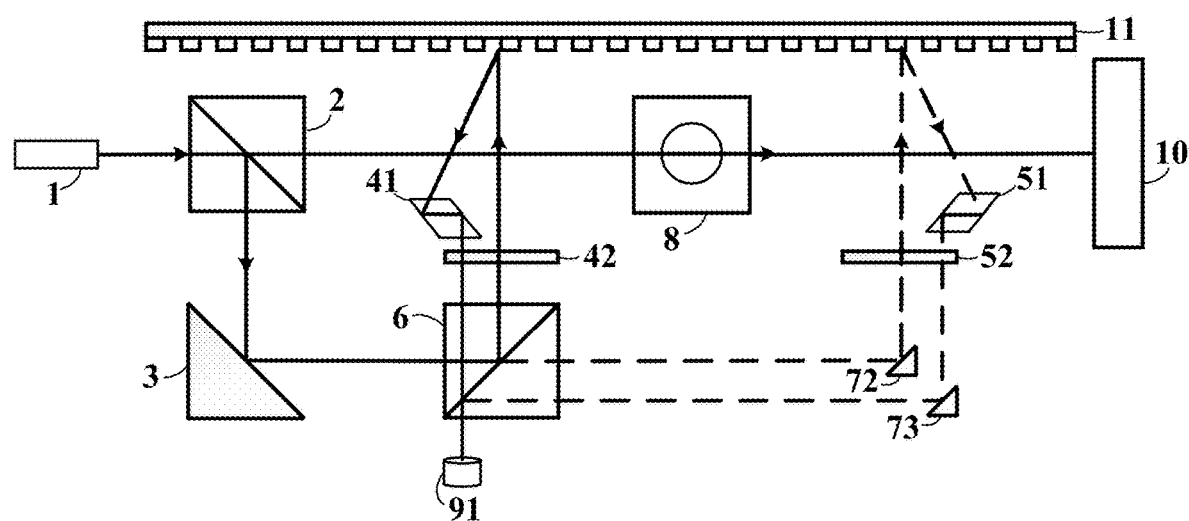
FIG. 2 is a second schematic diagram of a hybrid displacement measuring device provided in an embodiment of the present invention.
Figure 3:
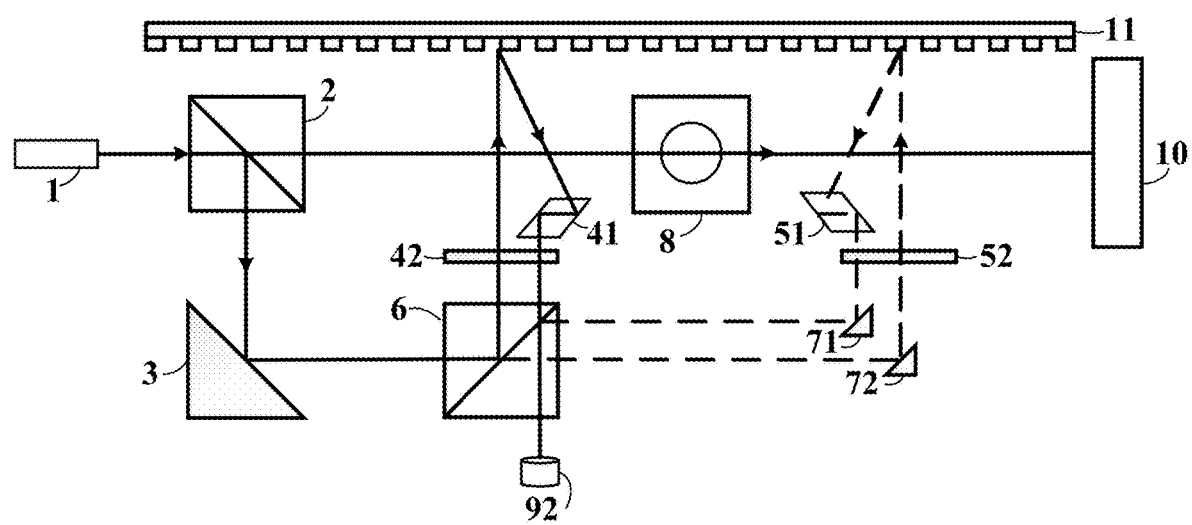
FIG. 3 is a third schematic diagram of a hybrid displacement measuring device provided in an embodiment of the present invention.
Figure 4:
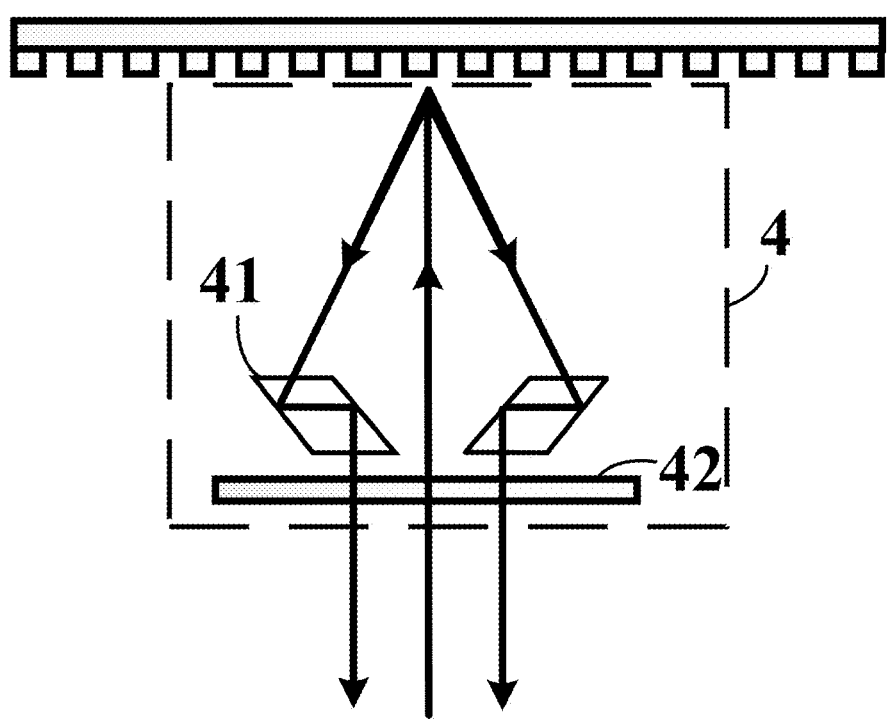
FIG. 4 is a fourth schematic diagram of a hybrid displacement measuring device provided in an embodiment of the present invention.
Figure 5:
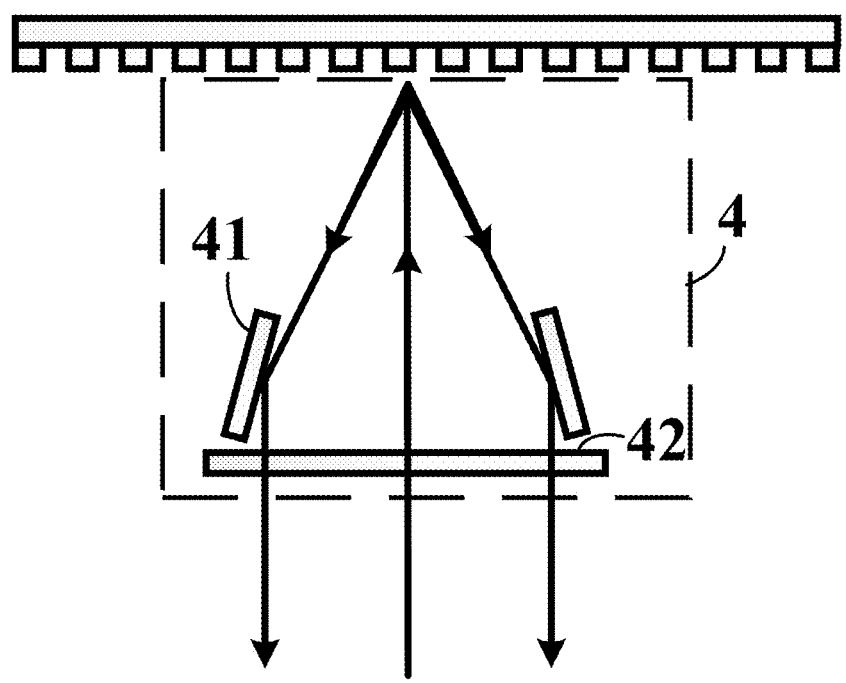
FIG. 5 is a fifth schematic diagram of a hybrid displacement measuring device provided in an embodiment of the present invention.
Figure 6:
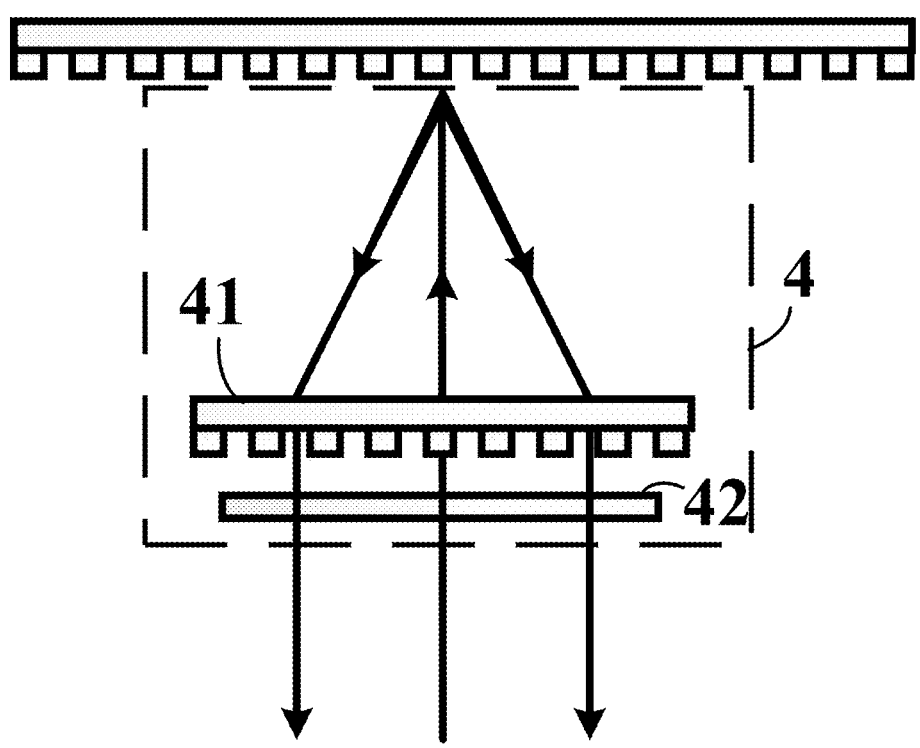
FIG. 6 is a sixth schematic diagram of a hybrid displacement measuring device provided in an embodiment of the present invention.
Figure 7:
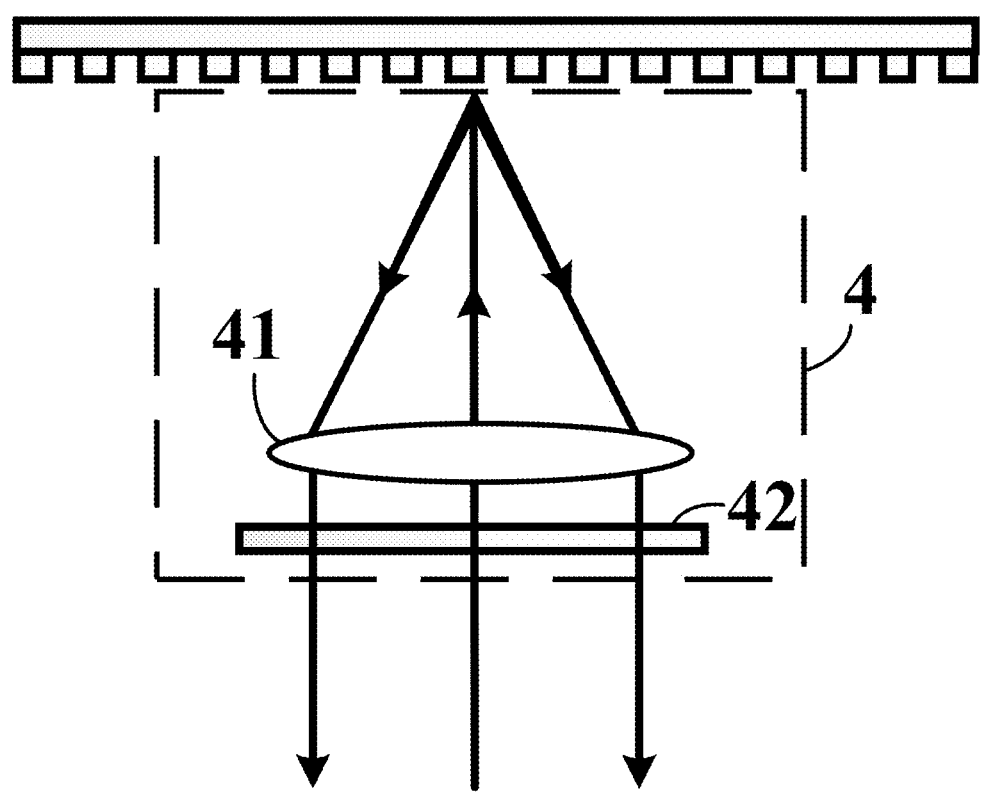
FIG. 7 is a seventh schematic diagram of a hybrid displacement measuring device provided in an embodiment of the present invention.

In this embodiment, the second reflective mirror 3 is positioned on the beam splitting surface of the first beam splitting mirror 2, and is positioned on the optical path of the first basic reflected beam. The second reflective mirror 3 is used to reflect the first basic reflected beam, such that the optical path of the first basic reflected beam is turned and the first basic reflected beam enters the second beam splitting mirror 6. The second beam splitting mirror 6 in turn splits the first basic reflective beam. For ease of description, the two beams obtained after the second light splitting mirror 6 splits the first basic reflected beam are designated as the first reflected beam and the first transmitted beam. The first reflected beam enters the grating ruler 11, which diffracts the first reflected beam to form the first primary diffracted beam. The first primary diffracted beam, after being turned by the first turning mirror 41, reenters the second light splitting mirror 6, and is transmitted from the second light splitting mirror 6 to the reading head. The first transmitted beam is reflected by the third reflective mirror 72 to the grating ruler 11, which diffracts the first transmitted beam to form the second primary diffracted beam. The second primary diffracted beam, after being turned by the second turning mirror 51, enters the fourth reflective mirror, then enters the second beam splitting mirror 6 from the fourth reflective mirror, and is then reflected to the reading head by the second beam splitting mirror 6. During this process, the first primary diffracted beam and the second primary diffracted beam interfere with each other, such that the reading head receives the first primary diffracted beam and the second primary diffracted beam at the same time. Specifically, FIGS. 2 and 3 show the diagrams of the distribution of the optical paths of the first reflected beam and the first transmitted beam when the number of the first turning mirror 41, the number of the second turning mirror 51, and the number of the reading head are all one, and FIG. 1 shows the diagram of the distribution of the optical paths when the number of the first turning mirror 41, the number of the second turning mirror 51, and the number of the reading head are two.

With reference to FIG. 1, in some embodiments, the first primary diffracted beam includes a first positive primary diffracted beam and a first negative primary diffracted beam, and the second primary diffracted beam includes a second positive primary diffracted beam and a second negative primary diffracted beam. The number of the first turning mirror 41 is two, and each of the first turning mirrors 41 is positioned corresponding to one of the first primary diffracted beams. The number of the second turning mirror 51 is two, and each of the second turning mirrors 51 is positioned corresponding to one of the second primary diffracted beams. The number of the fourth reflective mirror is two, and each of the fourth reflective mirrors is positioned corresponding to one of the second primary diffracted beams. The number of the reading head is two, and each of the reading heads is positioned corresponding to one of the first primary diffracted beams. The interference signal includes a first interference signal and a second interference signal. The first positive primary diffracted beam and the second negative primary diffracted beam generate the first interference signal, and the first negative primary diffracted beam and the second positive primary diffracted beam generate the second interference signal. The reading head combination 9 generates the first displacement information according to the first interference signal and the second interference signal.

In this embodiment, the reading head combination 9 comprises the first reading head 91 and the second reading head 92. The first positive primary diffracted beam and the second negative primary diffracted beam interfere with each other and enter the second reading head 92, and the first negative primary diffracted beam and the second positive primary diffracted beam interfere with each other and enter the first reading head 91, thereby achieving separate acquisition of the first interference signal and the second interference signal.

Specifically, when the grating ruler 11 moves along the grating vector direction, the first negative primary diffracted beam and the second positive primary diffracted beam interfere with each other to form a Doppler frequency shift of 2Δf, and the first positive primary diffracted beam and the second negative primary diffracted beam interfere with each other to form a Doppler frequency shift of 2Δf. The first interference signal and the second interference signal corresponding to the two Doppler frequency shifts respectively are subjected to differential processing to achieve displacement measurement, in a first direction X, of the worktable to be measured, that is, to obtain the first displacement information.

With reference to FIGS. 1 to 7, in some embodiments, the first turning mirror 41 and/or the second turning mirror 51 are any one of a trapezoidal turning prism, a planar reflective mirror, a one-dimensional transmission grating, and a condenser lens.

The choice of the trapezoidal turning prism enables the first primary diffracted beam and/or the second primary diffracted beam to shift by a small distance in space, achieving the goal of saving space. The planar reflector can achieve direct outgoing of the first primary diffracted beam and/or the second primary diffracted beam, and at the same time eliminate the influence of other stray light associated with the grating scale 11, achieving the goal of attaining quadruple optical subdivision by diffracting once. The one-dimensional transmission grating is configured as a lens assembly with a blank center, and can achieve parallel outgoing of 0th-order diffracted light from the grating. The one-dimensional transmission grating with parallel grating lines on both sides can achieve parallel outgoing of ±1st-order diffracted light. The measuring distance of the condenser lens is greatly restricted due to the limitation of its own focal length, and the displacement measurement in the Z-axis can only be confined within the focal length range of the condenser lens.

With reference to FIGS. 1 to 7, in some embodiments, the second beam splitting mirror 6 is a polarizing beam splitting prism, and the turning mirror combination further comprises the first quarter-wave plate 42 and the second quarter-wave plate 52. The first quarter-wave plate 42 is positioned between the first turning mirror 41 and the second beam splitting mirror 6, and is used to adjust the polarization states of the first primary diffracted beam. The second quarter-wave plate 52 is positioned between the second turning mirror 51 and the fourth reflective mirror, and is used to adjust the polarization states of the second primary diffracted beam.

In this embodiment, the second beam splitting mirror 6 is a polarizing beam splitting prism, and hence the second beam splitting mirror 6 will transmit the first basic reflected beam in one polarization state and reflect the first basic reflected beam in the other polarization state. In this circumstance, the diffracted beams generated by the grating ruler 11 needs modulation of the polarization states by means of the first quarter-wave plate 42 and the second quarter-wave plate 52 before entering the second beam splitting mirror 6, in order to achieve the effect of transmission of the first primary diffracted beam and reflection of the second primary diffracted beam at the second beam splitting mirror 6.

Figure 9:
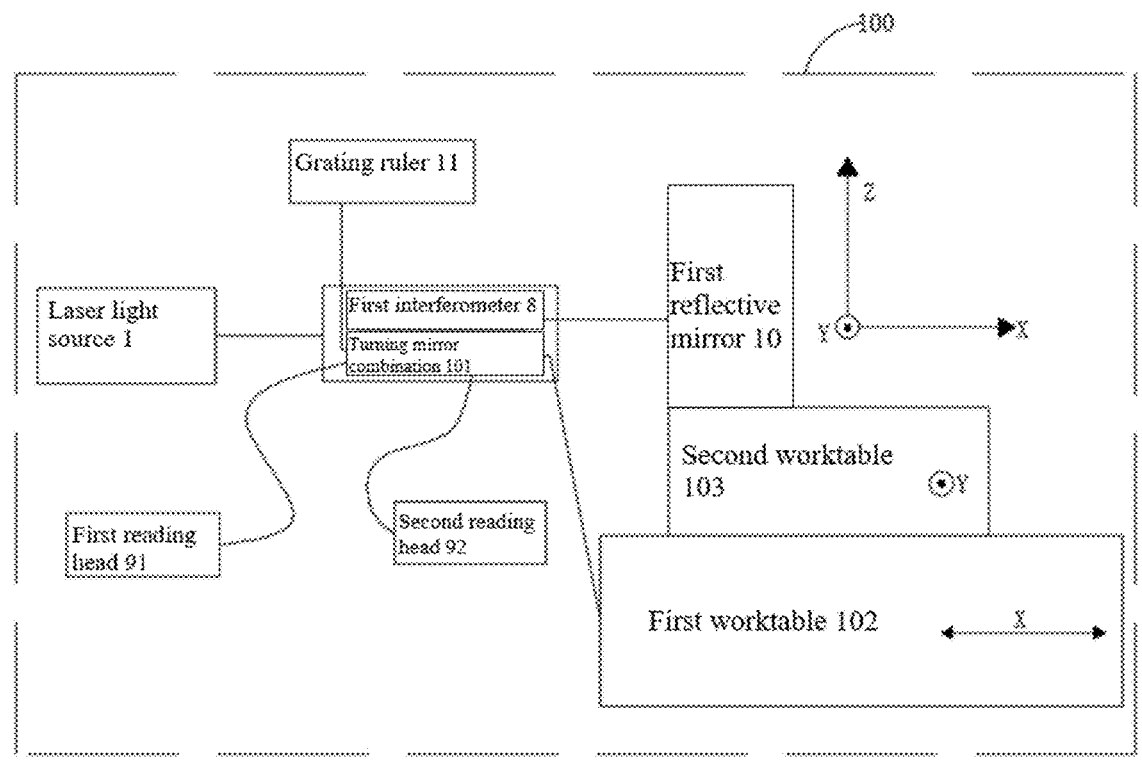
FIG. 9 is a ninth schematic diagram of a hybrid displacement measuring device provided in an embodiment of the present invention.

With reference to FIG. 9, in some embodiments, in the hybrid displacement measuring device 100, the worktable to be measured comprises a first worktable 102 and a second worktable 103 positioned from bottom to top. The first worktable 102 can move along the first direction X relative to the grating ruler 11, and the second worktable 103 can move along a second direction Y relative to the grating ruler 11, the first direction X being perpendicular to the second direction Y The turning mirror combination 101 is maintained fixed relative to the first worktable 102, and the first displacement information is the displacement information of the first worktable 102. The first reflective mirror 10 is maintained fixed relative to the second worktable 103, and the second displacement information is the displacement information of the second worktable 103.

In this embodiment, the positional relationships among the first direction X and the second direction Y, the laser light source 1, the turning mirror combination 101, the first interferometer 8, the first reflective mirror 10, the grating ruler 11, the first reading head 91 and the second reading head 92, and the worktable to be measured are shown in FIG. 9. The first worktable 102 and the second worktable 103 can be positioned one over the other. The first worktable 102 itself moves, and causes the second worktable 103 to move, along the X direction, and the second worktable 103 itself moves along the second direction Y, thereby achieving displacement of the worktable to be measured in the two directions. Specifically, the first reflective mirror 10 is positioned on the second worktable 103, and the first basic transmitted beam reflected by the first reflective mirror 10 contains displacement information of the second worktable 103, whereas the first worktable 102 is maintained fixed to the turning mirror combination 101, and the diffracted beam obtained after the first basic reflected beam is diffracted by the grating ruler 11 contains displacement information of the first worktable 102.

By performing calculation on the first displacement information and the second displacement information, the spatial displacement information of the first worktable 102 and the second worktable 103 can be obtained accordingly, including the rotational displacement, etc., of the first worktable 102 and the second worktable 103 in the first direction X and the second direction Y.

Figure 8:
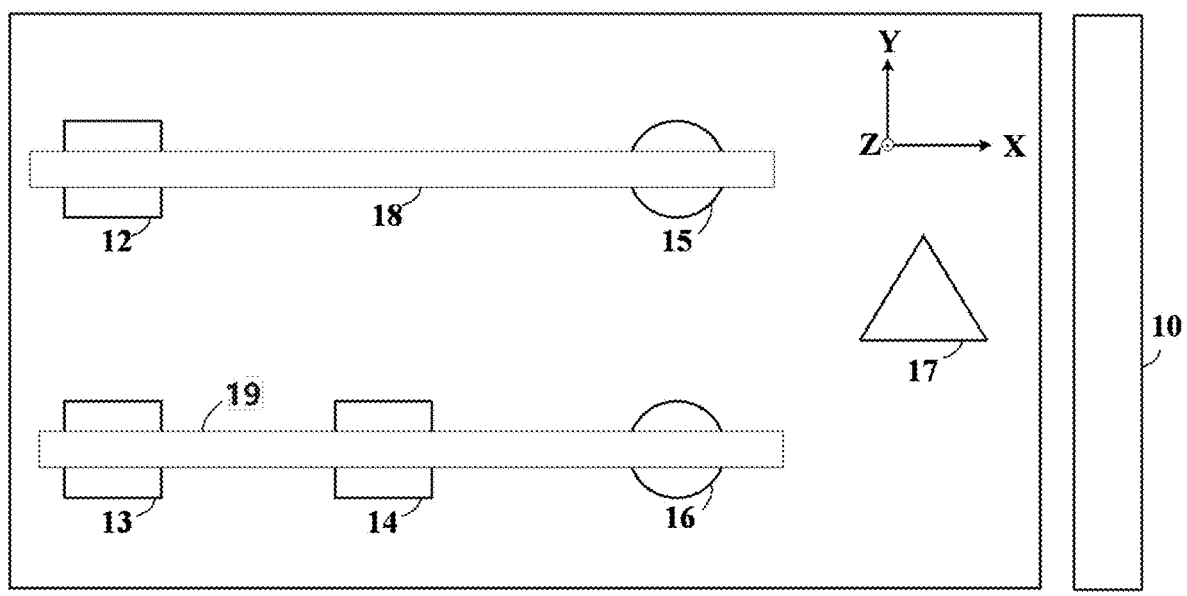
FIG. 8 is an eighth schematic diagram of a hybrid displacement measuring device provided in an embodiment of the present invention.

With reference to FIG. 8, in some embodiments, a grating ruler combination specifically comprises a first grating ruler 18 and a second grating ruler 19 arranged in parallel along the second direction Y, the first grating ruler 18 and the second grating ruler 19 both extending along the first direction X. The number of the first measuring assembly 15 is two, with one of the first measuring assemblies 15 being positioned corresponding to the first grating ruler 18, and the other of the second measuring assemblies being positioned corresponding to the second grating ruler 19.

With reference to FIG. 8, in some embodiments, further included are a second interferometer 17, a third interferometer 12, a fourth interferometer 13, and a fifth interferometer 14. The second interferometer 17 is positioned on the turning path of the first reflective mirror 10, and is used to measure third displacement information of the worktable to be measured in the first direction X. The third interferometer 12 is positioned below the first grating ruler 18, and is used to measure fourth displacement information of the worktable to be measured in a third direction Z, the third direction Z being perpendicular to the first direction X and the second direction Y, respectively. The fourth interferometer 13 is positioned below the second grating ruler 19, and is arranged in parallel with the third interferometer 12 along the second direction Y The fourth interferometer 13 is used to measure fifth displacement information of the worktable to be measured in the third direction Z. The fifth interferometer 14 is positioned below the second grating ruler 19, and is positioned between the fourth interferometer 13 and the first measuring assembly 15 below the second grating ruler 19. The fifth interferometer 14 is used to measure sixth displacement information of the worktable to be measured in the third direction Z.

The above statement is to be understood in conjunction with FIG. 8: In this embodiment, the number of the first measuring assembly 15 is two, the two being designated as first measuring assembly 15 and third measuring assembly 16 for ease of description. The two first measuring assemblies 15 are positioned on two sides of the center of the hybrid displacement measuring device and are distributed symmetrically. The third direct Z is introduced, which is the vertical direction in a spatial coordinate system. The third interferometer 12, the fourth interferometer 13, and the fifth interferometer are used to measure the displacement of the worktable to be measured in the third direction Z. The third interferometer 12 and the fourth interferometer 13 are distributed symmetrically on two sides of the center of the measuring device. The fourth interferometer 13 is positioned parallel to the fifth interferometer 14, and the fifth interferometer 14 is positioned between the third measuring assembly 16 and the fourth interferometer 13. The second interferometer 17 is used to measure the displacement of the worktable to be measured in the first direction X. The grating ruler is positioned perpendicular to the first measuring assembly 15. The first grating ruler 18 corresponds to the first measuring assembly 15, and the second grating ruler 19 corresponds to the third measuring assembly 16. The first reflective mirror 10 serves as the measuring basis for the second interferometer 17. The displacement information of the worktable to be measured in the first direction X can be expressed as the sum of the average value of the first measurement assembly 15 and the third measurement assembly 16 and the data from the second interferometer 17. The displacement information of the worktable to be measured in the second direction Y can be expressed as the average value of the displacement data acquired by the third interferometer 12, the fourth interferometer 13, and the fifth interferometer 14. The self deflection (Rz) of the entire measuring device can be calculated from the displacement data of the reading heads in the first measuring assembly 15 and the third measuring assembly 16; the self rotation (Rx) of the measuring device can be calculated according to the displacement data acquired by the third interferometer 12 and the fourth interferometer 13; the self pitch (Ry) of the measuring device can be calculated according to the displacement data acquired by the fourth interferometer 13 and the fifth interferometer 14.

Figure 10:
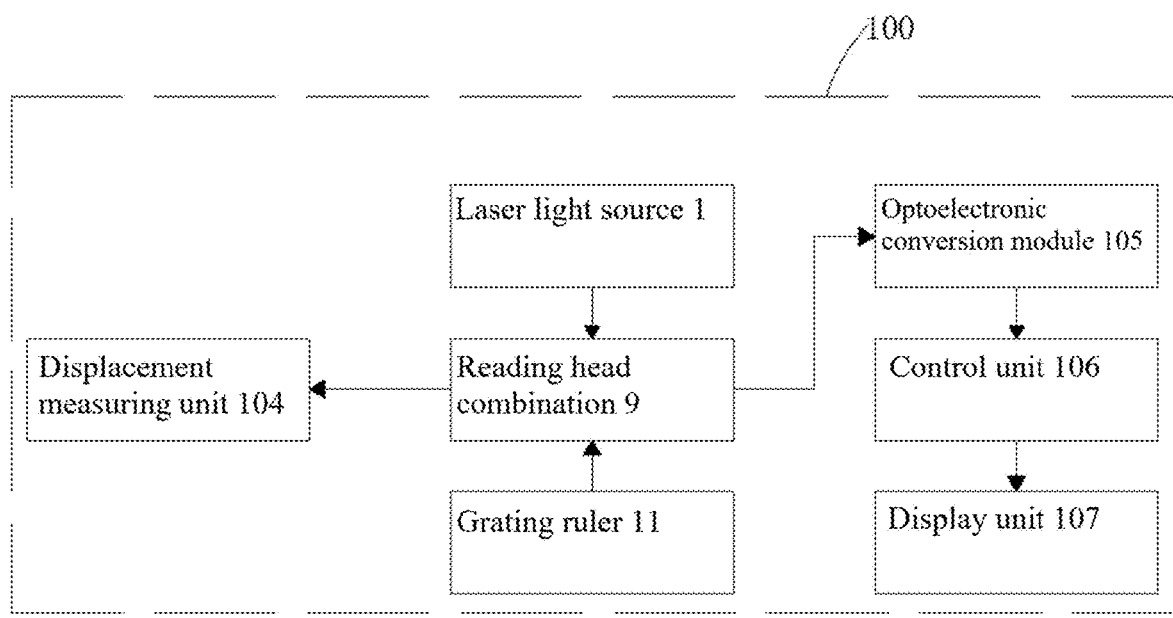
FIG. 10 is a tenth schematic diagram of a hybrid displacement measuring device provided in an embodiment of the present invention.

With reference to FIG. 10, in some embodiments, the hybrid displacement measuring device 100 further comprises a displacement measuring unit 104, a photoelectric conversion module 105, and a control unit 106. The displacement measuring unit 104 is electrically connected to the reading head combination 9, and is used to generate an interference signal according to the first primary diffracted beam and the second primary diffracted beam. The photoelectric conversion module 105 is electrically connected to the displacement measuring unit 104, and is used to convert the interference signal into an electrical signal. The control unit 106 is used to generate the first displacement information according to the electrical signal. In this embodiment, the control unit 106 is used to perform operations such as shaping, refining, and sense finding on the electrical signal to obtain the displacement data.

With reference to FIG. 10, in some embodiments, a display unit 107 is further comprised. The display unit 107 is electrically connected to the control unit 106, and is used to display the first displacement information. The positional relationships among the laser light source 1, the reading head combination 9, the grating ruler 11, the displacement measuring unit 104, the photoelectric conversion module 105, the control unit 106, and the display unit 107 can be understood in conjunction with FIG. 10.

In the above technical solution, the hybrid displacement measuring device comprises the worktable to be measured, the grating ruler, the laser light source, the first beam splitting mirror, the first measuring assembly, and the second measuring assembly. The laser light source, the first beam splitting mirror, the turning mirror combination, and the first reflective mirror are all maintained fixed relative to the worktable to be measured. The laser light source is used to generate a laser beam. The first beam splitting mirror splits the laser beam and generates a first basic reflected beam and a first basic transmitted beam. The first basic reflected beam enters the grating ruler under the action of the turning mirror combination and is diffracted by the grating ruler to generate a diffracted beam. The diffracted beam is then acquired by the reading head to generate the first displacement information of the worktable to be measured. The first basic transmitted beam is reflected by the first reflective mirror and then enters the first interferometer, which acquires the second displacement information of the worktable to be measured. The displacement measurement of the worktable to be measured by the entire hybrid displacement measuring device is achieved by means of the first displacement information and the second displacement information. In this technical solution, a hybrid measuring approach that integrates grating and laser is proposed based on the advantages of the two measuring means. The grating ruler is used to perform long-distance measurement distal to the mirror, and the first interferometer is used to perform short-distance measurement proximal to the mirror, thereby solving the problem that it is difficult to guarantee both the range and the precision of displacement measurement of a step-and-scan two-dimensional worktable to be measured.

Although the embodiments of the present invention have been shown and described above, it should be understood that the above embodiments are exemplary and should not be construed as limiting the present invention. Those of ordinary skill in the art can make changes, modifications, substitutions, and variations to the above embodiments within the scope of the present invention.

The above specific embodiments of the present invention do not constitute limitation on the scope of protection of the present invention. Any other corresponding changes and modifications made according to the technical concept of the present invention shall be encompassed within the scope of protection of the claims of the present invention.

What is claimed is:

1. A hybrid displacement measuring device, characterized by comprising:
   a worktable to be measured;
   a grating ruler;
   a laser light source, which is used to generate a laser beam;
   a first beam splitting mirror, which is positioned at an output end of the laser light source, and which is used to split the laser beam to generate a first basic reflected beam and a first basic transmitted beam;
   a first measuring assembly, which is positioned on the optical path of the first basic reflected beam, and which comprises a turning mirror combination and a reading head combination, the reading head combination comprising at least one reading head, the turning mirror combination being used to turn the first basic reflected beam to the grating ruler, such that the grating ruler diffracts the first basic reflected beam and generates a diffracted beam, the turning mirror combination being also used to turn the diffracted beam to the reading head, the reading head being used to generate, according to the diffracted beam, first displacement information of the worktable to be measured; and
   a second measuring assembly, which comprises a first reflective mirror and a first interferometer, the first interferometer and the first reflective mirror being positioned on the optical path of the first basic transmitted beam sequentially, the first reflective mirror being positioned on the worktable to be measured, and being used to reflect the first basic transmitted beam to the first interferometer, the first interferometer being used to generate, according to the first basic transmitted beam reflected by the first reflective mirror, second displacement information of the worktable to be measured;
   the first beam splitting mirror, the turning mirror combination, and the first reflective mirror being all maintained fixed relative to the worktable to be measured;
   the turning mirror combination comprising:
   a second reflective mirror, which is positioned on the optical path of the first basic reflected beam;
   a second beam splitting mirror, which is positioned facing a reflection surface of the second reflective mirror, and which is used to split the first basic reflected beam turned by the second reflective mirror to generate a first reflected beam and a first transmitted beam, the first reflected beam being turned by the second beam splitting mirror to the grating ruler, such that the grating ruler diffracts the first reflected beam and generates a first primary diffracted beam;
   a first turning mirror, which is positioned on the optical path of the first primary diffracted beam, and which is used to turn the first primary diffracted beam to the second beam splitting mirror, through which the first primary diffracted beam is transmitted the reading head;
   a third reflective mirror, which is positioned on the optical path of the first transmitted beam, and which is used to turn the first transmitted beam to the grating ruler, such that the grating ruler diffracts the first transmitted beam and generates a second primary diffracted beam;
   a second turning mirror, which is positioned on the optical path of the second primary diffracted beam, and which is used to turn the second primary diffracted beam; and
   a fourth reflective mirror, which is positioned on the turning path of the second primary diffracted beam, and which is used to turn the second primary diffracted beam to the second beam splitting mirror, where the second primary diffracted beam is reflected to the reading head;
   the first primary diffracted beam and the second primary diffracted beam generating an interference signal, and the reading head generating the first displacement information according to the interference signal.

2. The hybrid displacement measuring device according to claim 1, characterized in that the first primary diffracted beam includes a first positive primary diffracted beam and a first negative primary diffracted beam, and the second primary diffracted beam includes a second positive primary diffracted beam and a second negative primary diffracted beam;
   the number of the first turning mirror is two, and each of the first turning mirrors is positioned corresponding to one of the first primary diffracted beams;
   the number of the second turning mirror is two, and each of the second turning mirrors is positioned corresponding to one of the second primary diffracted beams;
   the number of the fourth reflective mirror is two, and each of the fourth reflective mirrors is positioned corresponding to one of the second primary diffracted beams;
   the number of the reading head is two, and each of the reading heads is positioned corresponding to one of the first primary diffracted beams; and
   the interference signal includes a first interference signal and a second interference signal, the first positive primary diffracted beam and the second negative primary diffracted beam generate the first interference signal, and the first negative primary diffracted beam and the second positive primary diffracted beam generate the second interference signal, and the reading head combination generates the first displacement information according to the first interference signal and the second interference signal.

3. The hybrid displacement measuring device according to claim 2, characterized in that the first turning mirror and/or the second turning mirror are any one of a trapezoidal turning prism, a planar reflective mirror, a one-dimensional transmission grating, and a condenser lens.

4. The hybrid displacement measuring device according to claim 3, characterized in that the second beam splitting mirror is a polarizing beam splitting prism, and the turning mirror combination further comprises:
- a first quarter-wave plate, which is positioned between the first turning mirror and the second beam splitting mirror, and which is used to adjust the polarization states of the first primary diffracted beam; and
- a second quarter-wave plate, which is positioned between the second turning mirror and the fourth reflective mirror, and which is used to adjust the polarization states of the second primary diffracted beam.

5. The hybrid displacement measuring device according to claim 4, characterized in that the worktable to be measured comprises a first worktable and a second worktable positioned from bottom to top, the first worktable can move along a first direction relative to the grating ruler, and the second worktable can move along a second direction relative to the grating ruler, the first direction being perpendicular to the second direction;
- the turning mirror combination is maintained fixed relative to the first worktable, and the first displacement information is the displacement information of the first worktable; and
- the first reflective mirror is maintained fixed relative to the second worktable, and the second displacement information is the displacement information of the second worktable.

6. The hybrid displacement measuring device according to claim 5, characterized in that the grating ruler comprises a first grating ruler and a second grating ruler arranged in parallel along the second direction, the first grating ruler and the second grating ruler both extending along the first direction; and
- the number of the first measuring assembly is two, with one of the first measuring assemblies being positioned corresponding to the first grating ruler, and the other of the second measuring assemblies being positioned corresponding to the second grating ruler.

7. The hybrid displacement measuring device according to claim 6, characterized by further comprising:
- a second interferometer, which is positioned on the turning path of the first reflective mirror, and which is used to measure third displacement information of the worktable to be measured in the first direction;
- a third interferometer, which is positioned below the first grating ruler, and which is used to measure fourth displacement information of the worktable to be measured in a third direction, the third direction being perpendicular to the first direction and the second direction, respectively;
- a fourth interferometer, which is positioned below the second grating ruler, and which is arranged in parallel with the third interferometer along the second direction, the fourth interferometer being used to measure fifth displacement information of the worktable to be measured in the third direction; and
- a fifth interferometer, which is positioned below the second grating ruler, and which is positioned between the fourth interferometer and the first measuring assembly below the second grating ruler, the fifth interferometer being used to measure sixth displacement information of the worktable to be measured in the third direction.

8. The hybrid displacement measuring device according to claim 7, characterized by further comprising:
- a displacement measuring unit, which is electrically connected to the reading head, and which is used to generate the interference signal according to the first primary diffracted beam and the second primary diffracted beam;
- a photoelectric conversion module, which is electrically connected to the displacement measuring unit, and which is used to convert the interference signal into an electrical signal; and
- a control unit, which is used to generate the first displacement information according to the electrical signal.

9. The hybrid displacement measuring device according to claim 8, characterized by further comprising:
- a display unit, which is electrically connected to the control unit, and which is used to display the first displacement information.

* * * * *